(12) United States Patent
Siksa et al.

(10) Patent No.: US 7,062,773 B1
(45) Date of Patent: Jun. 13, 2006

(54) SYSTEM AND METHOD FOR PROVIDING GRAPHICAL USER INTERFACE CONTROL ENHANCERS

(75) Inventors: Mary Ellen Siksa, Tampa, FL (US); Steven Pothoven, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/119,427

(22) Filed: Jul. 20, 1998

(51) Int. Cl.
*G06F 9/00* (2006.01)

(52) U.S. Cl. ............... 719/329; 715/744; 715/762; 715/803; 717/101

(58) Field of Classification Search ........ 709/310–332; 345/700–866; 717/100–167; 719/311–329; 715/700–866
See application file for complete search history.

(56) References Cited

U.S. PATENT DOCUMENTS

| | | | | |
|---|---|---|---|---|
| 5,479,601 A | * | 12/1995 | Matheny et al. | 345/700 |
| 5,555,365 A | * | 9/1996 | Selby et al. | 345/765 |
| 5,651,108 A | * | 7/1997 | Cain et al. | 345/763 |
| 5,689,668 A | * | 11/1997 | Beaudet et al. | 345/841 |
| 5,694,561 A | * | 12/1997 | Malamud et al. | 345/805 |
| 5,754,173 A | * | 5/1998 | Hiura et al. | 345/744 |
| 5,911,068 A | * | 6/1999 | Zimmerman et al. | 719/328 |
| 6,069,629 A | * | 5/2000 | Paterson et al. | 345/808 |
| 6,121,964 A | * | 9/2000 | Andrew | 345/333 |
| 6,424,354 B1 | * | 7/2002 | Matheny et al. | 345/619 |
| 6,493,002 B1 | * | 12/2002 | Christensen | 345/779 |

* cited by examiner

*Primary Examiner*—Meng-Al T. An
*Assistant Examiner*—Charles Anya
(74) *Attorney, Agent, or Firm*—JoAnn Kealy Crockett; Anne Vachon Dougherty

(57) ABSTRACT

A software application system and method to aid in rapid graphical user interface (GUI) development in object-oriented development environments where sub-classing (buttons, list boxes, edit controls, etc.) provided by the compiler or a GUI toolkit are not appropriate. While the invention was motivated by the environment stated above, it can be used in any object-oriented GUI programming environment. This invention provides a method for adding functionality to native controls including, but not limited to: initializing the control with data or other settings; retrieving data from the control; formatting the data; validating the data entered; storing validated data in files or databases; handling multiple controls to create the illusion of a single control; and, establishing relationships between controls. The inventive system and method comprises a set of building blocks referred to as control enhancers, each including a data storage, a data initializer, a data finalizer, and means for maintaining and acting upon control relationships between the control enhancer and other control enhancers for related controls.

24 Claims, 5 Drawing Sheets

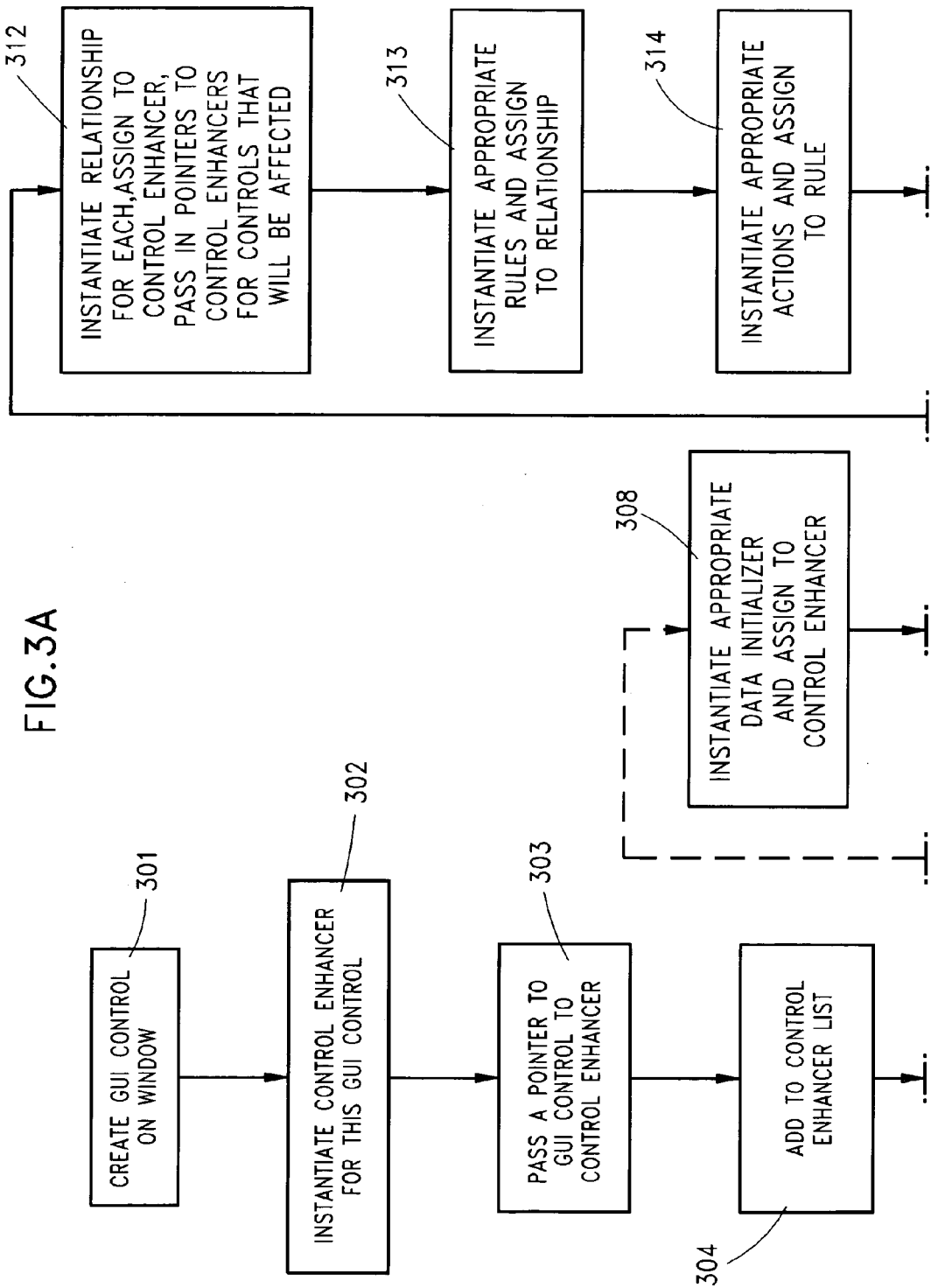

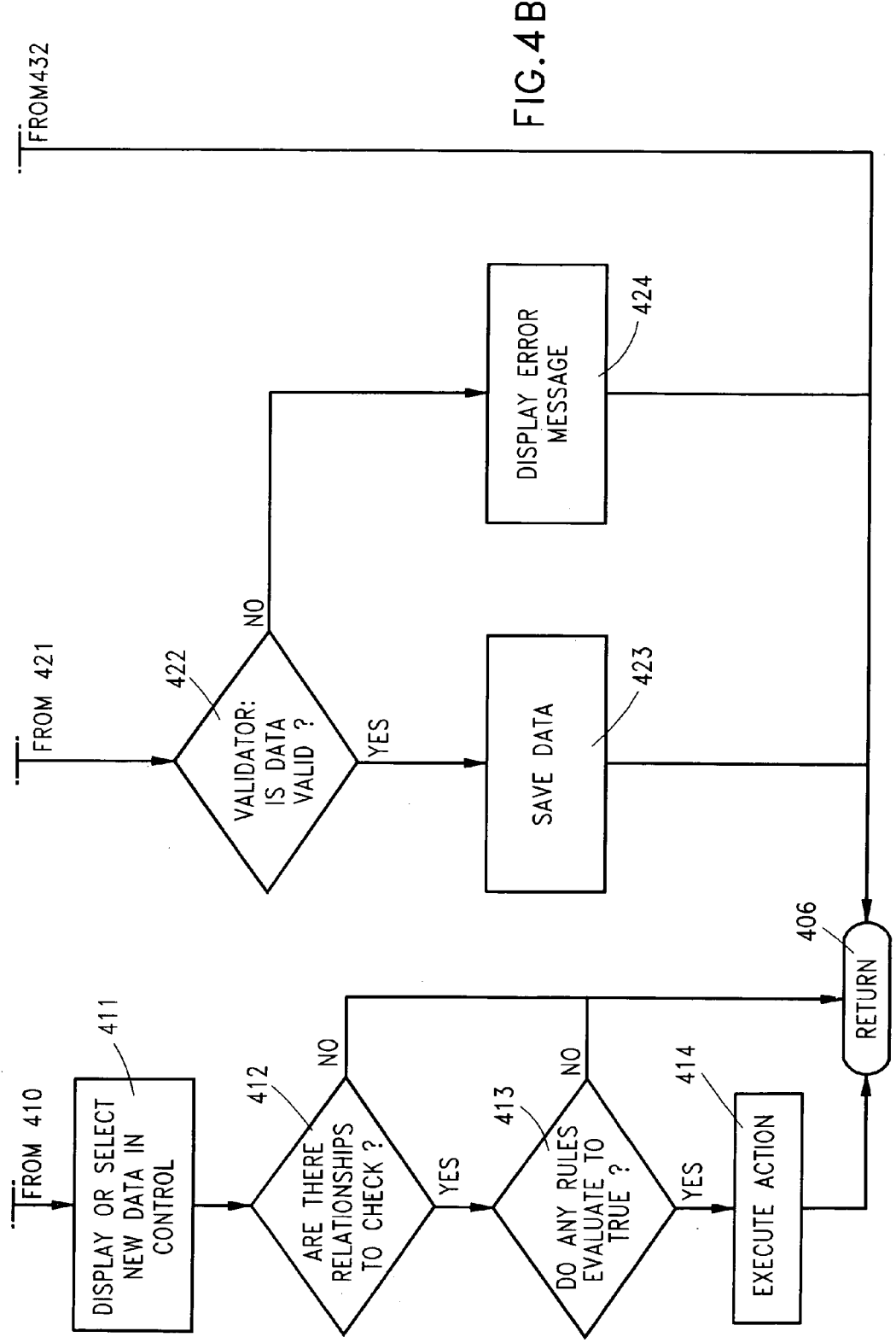

SYSTEM AND METHOD FOR PROVIDING GRAPHICAL USER INTERFACE CONTROL ENHANCERS

FIELD OF THE INVENTION

This invention relates to computer:user interactions and more particularly to developing graphical user interfaces which improve on the model-view-controller design.

BACKGROUND OF THE INVENTION

In developing a graphical user interface (GUI) in an object-oriented environments, various methods have been developed for implementing controls. In U.S. Pat. No. 5,555,365, a table is created which specifies the relationship between graphical user interface (hereinafter, GUI) objects and the application object. In the alternative, a programmer can write all of the code for each control on each window to display, format, validate, save data and manage control relationships. Such an approach is inefficient from the perspectives of programmer time, space and operating time, particularly in light of the fact that many of the controls could be "re-used" for different applications.

C++ programmers subclass a set of classes that represent controls included with a compiler or GUI development toolkit or framework. Subclassing the set of provided control classes for specialized purposes is the standard practice for creating specialized controls in an object-oriented graphical environment. For example, a programmer would create a subclass of a list box which reads/writes data from/to a database; create another subclass of the list box which reads/writes its data to/from a table, etc. In this example, if a list box is needed which reads data from a table, then writes the selected entry to a database, a fourth subclass must be written. Additionally, the window code has to be written to manage any relationships between this fourth list box and the other controls on the window. For example, if the user selects the entry "April" out of a list of months, another control on the screen which displays the number of days in the month must be changed to "30".

The subclassing method has two significant disadvantages: (1) in a large application, the number of subclasses can become very large requiring long development time and a significant amount of code which must be written to manage the relationships between controls; and, subclassing controls prohibits the use of some test tools. Subclassing can also lead to a large number of classes being subclassed from the same control resulting in fewer classes having mix and match capabilities. While some programs provide controls that are "completely functional", in terms of the class doing everything needed without additional coding, those controls are rarely acceptable for every programming assignment, and are not directly customizable.

What is desirable is a system and method whereby one can leave controls in their respective native class, yet use a set of building blocks to add functionality to the controls, thereby building a GUI application in less time than it would take to write special code for each control function. Using such an inventive system and method, the programmer can develop a set of reusable tools specifically geared toward the special needs of a given application. Existing controls, whether native or enhanced by a compiler vendor or by a third party, could participate in the design as well.

SUMMARY OF THE INVENTION

A software application system and method is disclosed to aid in rapid graphical user interface (GUI) development in object-oriented development environments where sub-classing GUI control classes (buttons, list boxes, edit controls, etc.) provided by the compiler or a GUI toolkit is not sufficient. The invention can be used in any object-oriented GUI cross-platform application. This invention provides a method for adding functionality to native controls including, but not limited to: initializing the control with data or other settings; retrieving data from the control; formatting the data; validating the data entered; storing validated data in files or databases; handling multiple controls to create the illusion of a single control; and, establishing relationships between controls. The inventive system and method comprises a set of building blocks for use in creating GUI windows with sophisticated functions in a very short time.

BRIEF DESCRIPTION OF THE DRAWINGS

The invention will now be described in greater detail with specific reference to the appended drawings wherein.

DESCRIPTION OF THE PREFERRED EMBODIMENT

Graphical user interface (hereinafter, GUI) window code is, with little exception, written in an event driven style. An "event" is a mouse click, a button click, a mouse movement, a keystroke, a verbal command to voice recognition hardware, or any of a host of perceptible interactions between the user and the program. The present invention, featuring the inventive Control Enhancer, is directed to a system in which the GUI windows are designed as event driven applications. While the ensuing description details the invention as implemented for event-driven applications (on, for example, Windows*, OS/2*, or UNIX)[1], it is contemplated that it could be implemented, with modification, for a menu driven application as well. The basic concept of the invention is to pass an event on to the Control Enhancer associated with a window object when the event pertains to the controls on that window (e.g., such that a window-sized event would be handled by the window object itself, while a mouse click on a radio button would be intended for the radio button control). The design itself can be used for any application on any platform. Code written according to this design can be used for any GUI application on the platform on which it is written, but may require slight modification when changing platforms, due to changes in native controls available on these platforms and how data is handled in the application. For example, different GUI applications have different internal representation of the data and the GUI control enhancers would need to be customized to read/write the appropriate format. Optimally, changing platforms does not require any code changes for differences in native controls when a cross-platform GUI control library is used to provide a consistent interface across platforms. The library hides the differences in available native controls on different platforms so that specifically-written code is not required for each platform.

[1]*Trademarks of respective owners

Figure 1:
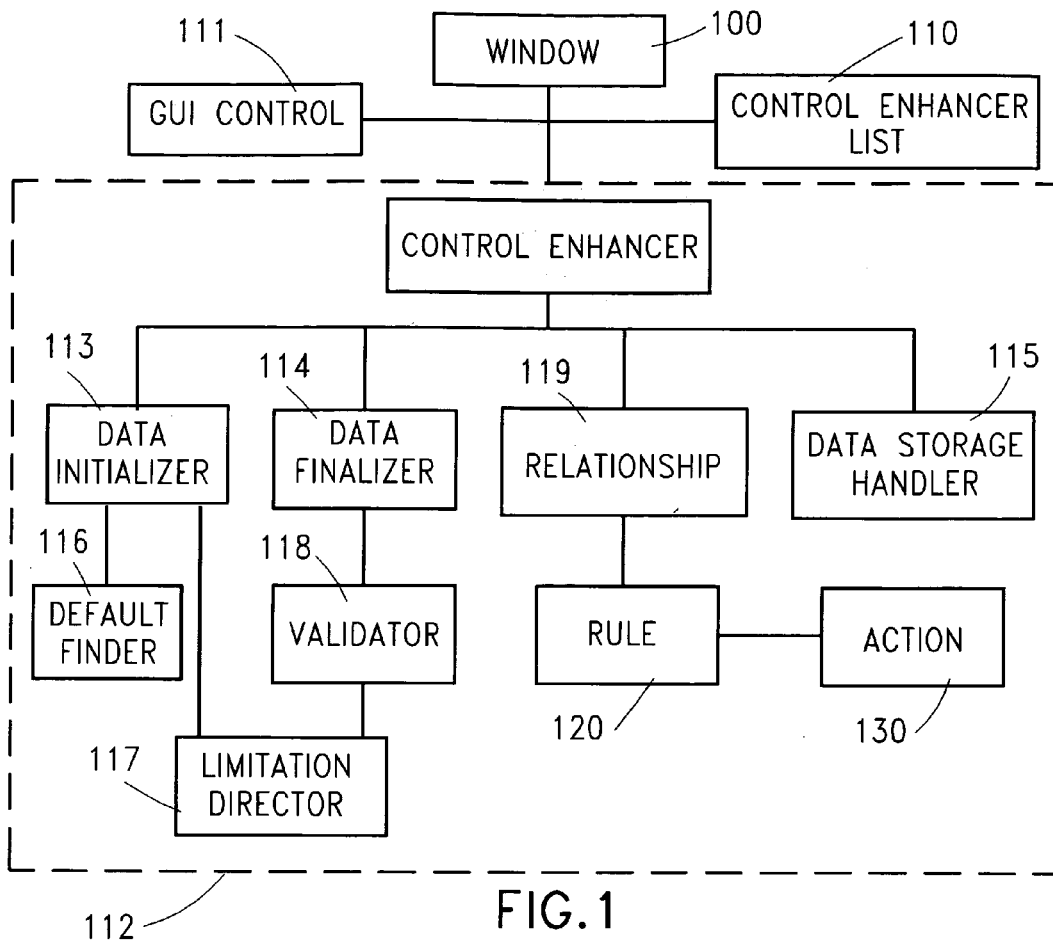
FIG. 1 provides an illustration of a system in accordance with the present invention.

Those having skill in GUI development are familiar with the model-view-controller (MVC) design. In an MVC implementation, the Model represents the data and the View displays the data (e.g., spreadsheet, listview, table, etc.). In a GUI application, there may be several active Views on the same data (e.g., a spreadsheet and a graph). When a View can be affected by data associated with a particular Model, the View registers itself with the Controller associated with that Model. A View requests changes to the data through the Controller. The Controller then tells the Model to change and subsequently notifies all registered Views that the data has changed. The inventive Control Enhancers are implemented in an MVC-based system. The Control Enhancer design consists of the following components, which will be detailed in full below, and are illustrated in FIG. 1: Control Enhancer, Data Storage, Data Initializer, Data Finalizer, Control Relationship, Rules, and Actions.

As illustrated in FIG. 1, each GUI control 111 on a window 100 is assigned to a Control Enhancer 112. The Control Enhancer 112 provides a consistent interface to the GUI Control, 111, for the window object, regardless of the nature of the control (e.g., text entry field, list box, combo box, etc.) For example, when a Control Enhancer is providing an interface which includes SetData, the Control Enhancer subclass may be managing a text object, a spin button, or some other object. The external code need only be aware of the Control Enhancer's SetData method, and not the specific methods for each control.

In addition to providing an interface to the GUI control for the window, the Control Enhancer provides a consistent interface to the GUI control for the Control Enhancer's internal components (i.e., the Data Initializer 113, Data Finalizer 114 and Data Storage Handler 115 to be detailed further hereinafter). A different Control Enhancer is designed to handle each kind of control, or a family of closely-related controls.

Each GUI window object maintains a collection of Control Enhancers for the controls on that window. The window object maintains a list of the Control Enhancers to which it passes events. The Control Enhancer List 110 is the object which passes the events on to the Control Enhancers. As each Control Enhancer is instantiated, it is registered with the Control Enhancer List. As each Control Enhancer is registered with the Control Enhancer List, it also registers which events will affect it. When the window receives an event, it passes the event to the Control Enhancer List which then passes the event to just those Control Enhancers which have registered as interested in such an event.

A Data Storage Handler 115 is assigned to each Control Enhancer. The Data Storage Handler determines where the data should be stored when a "save" event is received, and handles the storage of that data. For example, data may be stored in a database, in an INI file, or in some other memory location for future processing. A new Data Storage Handler is designed to handle each way in which the data may be stored by the program.

When the window code instantiates a Control Enhancer, it also instantiates a Data Initializer 113 of the desired type and passes it to the Control Enhancer. A new Data Initializer is designed to handle each type of data initialization. For example, initial data values or settings for a control may come from tables, INI files, or a database, and the program may store the data in one format, but need to display it in another format. Different Data Initializers would handle different initial data. Each Data Initializer handles any data manipulation required upon initialization. The Control Enhancer activates the Data Initializer when an Initialize event is received. Default Finder 116 and Limitation Director 117 are associated with the Data Initializer, as further detailed below.

A Data Finalizer 114 is associated with each Control Enhancer to prepare the data to be stored by the Data Storage Handler. When the Control Enhancer receives a Save event, it informs the Data Storage Handler, which in turn consults the Data Finalizer to determine what data or setting should be stored. A new Data Finalizer is designed to handle each type of data preparation which may be needed by the program. For example, a program may need to store a value "A" but display it as "All Values." The Data Finalizer handles any data manipulation that should be done before the data from the control is stored. A Validator 118 and the aforementioned Limitation Director 117 are associated with the Data Finalizer.

On some windows, the programmer may find it necessary to change one control based upon the setting of another control. A Control Relationship 119 is therefore assigned to one of the Control Enhancers (known as the Owning Control Enhancer), with a pointer maintained to the Affected Control Enhancer. Each Control Enhancer maintains a set of Control Relationships as necessary. When the Owning Control Enhancer received a Change event, it passes this event on to any Affected Control Enhancers in its relationships. A Control Enhancer may have more than one relationship as determined by the programmer.

Figure 2:
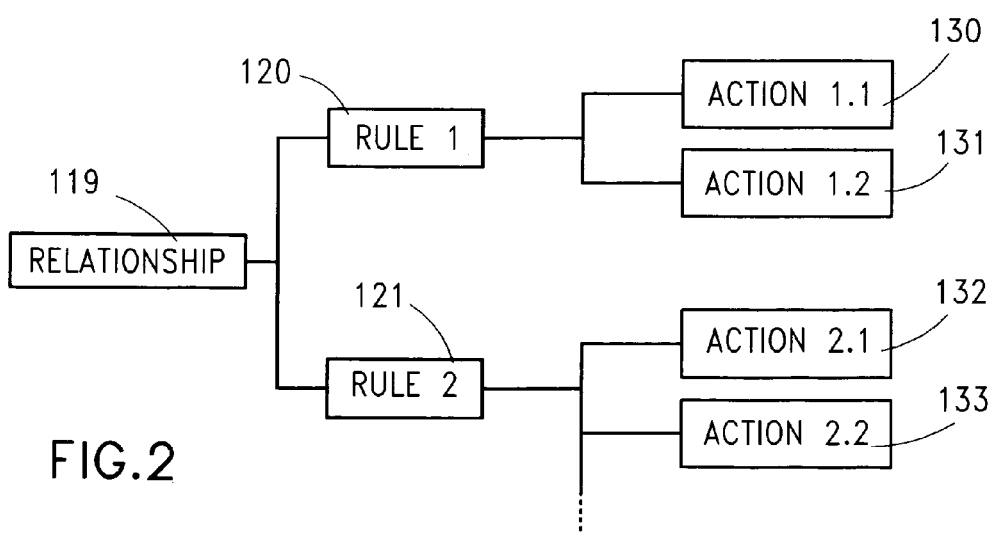
FIG. 2 illustrates a control relationship handled by the inventive system.

As depicted in FIG. 2, relationships are assigned Rules, 120 and 121, and Rules are assigned Actions, 130, 131, etc. Rules are objects that look at the data values of both controls (i.e., that of the Owning Control Enhancer and that of the other Control Enhancer in the relationship) and make a comparison. If the comparison holds true, then the Rule is said to be satisfied. When a Rule is satisfied, the Action is triggered. The Action sends messages to the Affected Control Enhancer to change its behavior. Rules must be defined for each type of comparison needed between controls. For example, a Greater Than Rule examines the data of the Owning Control Enhancer to see if it is greater than the data of the Affected Control Enhancer. If it is, then its Action is triggered. Actions must be defined to handle each kind of behavior change needed by a program. For example, when triggered, a Disable Action would tell the Affected Control Enhancer to disable its control. The way in which the Disable Action in the foregoing example could be implemented is as follows: assume that a checkbox on a window has an Owning Control Enhancer, and an Affected Control Enhancer manages a text entry field. The text entry field is to be disabled if the checkbox is selected (e.g., "checked"). When the Owning Control Enhancer for the checkbox receives the "checked" event, it asks its Rule to make the appropriate comparison (i.e., compare status, which is "checked" to status required by Rule). Since the event did result in the box being "checked," the Rule was satisfied and the Action triggered, resulting in a Disable message being sent to the Affected Control Enhancer.

Each control may have relationships with multiple controls on the window. Relationships may, in turn, have multiple Rules. For each Rule, there may be multiple Actions assigned (e.g., Action1—send Disable message to Affected Control Enhancer, Action2—send a change color message to Affected Control Enhancer). The Owning Control Enhancer passes the Change event on to each of its Relationships, at which each checks all of its Rules and, as appropriate, triggers one or more of the consequent Actions.

Implementation of the present inventive Control Enhancer consists of assembling the various components in different ways to obtain the desired results. Basically, the assembly of a Control Enhancer corks in the following manner: The window creates a GUI control at 301 and then creates a Control Enhancer at 302. The window next passes the Control Enhancer a pointer to the GUI control at 303 and adds the Control Enhancer to the Control Enhancer List at 304. A determination is made at 305 as to whether a special Data Storage Handler will be required. If required, the window assigns a Data Storage Handler object of the appropriate type to the created Enhancer at step 306. Next, at step 307, a determination is made as to whether special initialization is required. If needed, a Data Initializer is assigned to the Enhancer by the window at step 308. Next, it is determined if a special Data Finalizer will be required, at step 309. Based upon the step 309 determination, the window assigns a Data Finalizer of the appropriate type at step 310.

If the control has relationships with other controls on the screen, as determined at step 311, additional steps are taken by the window including the following: at 312, instantiating each Relationship, assigning the instantiated Relationship to the Control Enhancer, and establishing pointers at both the Owning and the Affected Control Enhancers; at 313, instantiating appropriate Rules to the Relationship; and, at 314, instantiating appropriate Actions and assigning Actions to the Rules. It is to be noted that the order in which steps 305, 307, 309 and 311 are executed is not critical.

Once the foregoing basic building blocks have been completed and tested, they can be combined in a variety of ways to handle almost any GUI window. Programming a GUI them becomes a matter of defining a common base window class which has several GUI controls that are managed with Control Enhancers. The coder can then derive subclasses from the base window class which add unique GUI controls for the specific window which it has been written to define. In this way, the coder does not have to re-code the common features of the code multiple times for each subclass.

When a Control Enhancer is assembled, as detailed above, it is assigned a Data Identifier which is used to specify the data for which it is responsible. The assigned Data Identifier is used by all of the Control Enhancer's associated objects. A dummy identifier can be used for controls that do not need to load any initial data or to save data when done (e.g., a status bar Control Enhancer, which simply displays messages from a file).

When the window creates the Control Enhancer, it call the Initialize method. The Control Enhancer in turn calls the Data Initializer's Initialize method. Each type of Data Initializer performs initialization specific to its type. One Data Initializer may use a Default Finder object 116 to find the default data based on the data identifier. Another Data Initializer may read data from an INI file, while another Data Initializer may read data from a database. When instructed to initialize, each Data Initializer reads its data from its appropriate source and then calls the SetData method of the Control Enhancer to display the data in the control.

The Control Enhancer initialization code also consults the table-driven Limitation Director 117, which uses the Data Identifier to find any appropriate limitations to be placed on the data. Example limitations include maximum and minimum lengths for the data, maximum and minimum values for the data, data type (e.g., all numeric, date, time, etc.). As is appropriate, the Control Enhancer may use this information to send the messages to its control to adjust its behavior, so that the user is properly guided through the use of the control.

After initialization, the Control Enhancer is prepared to respond to appropriate events. When a window event is detected at 401, the window accesses the Control Enhancer List at step 402 and determines, at 403 if there are any Control Enhancers which are registered as interested in that type of event. If no Control Enhancers have registered for that type of event, the event is ignored, at step 404. If it is determined at step 403 that there is at least one Control Enhancer registered at the list as affected by such a window event, the interested Control Enhancer gets the event at step 405. At the Control Enhancer, it is determined, at step 410, whether the event is a Display event. If not, it is next determined, at step 420, if the event is a Save event. If not, it is next determined, at 430, if the event is an initialize event. If not, there may be a succession of other types of events (not shown) which can be handled.

If the event is a Display event, as determined at step 410, the system displays or selects new data in the control, at step 411. If there are any Relationships to check, as determined at step 412, the Rules are checked (e.g., by comparison) at step 413. If any of the Rules evaluate to true, then the indicated Action is executed at step 414.

If the event is a Save event, as determined at step 420, the event is passed to the Data Finalizer at step 421. An optional step of validating the data can be implemented at step 422. For validation, the programmer must set up tables, keyed on the Data Identifiers, to provide information on if and how data should be validated. If the Validation object finds that data has been entered incorrectly, it communicates an error message number to an error window at step 424, which displays the proper message to the user. Normally, in a GUI environment, the control restricts the user's selections so that invalid selections cannot be made. However, in those cases where such is not possible, the Control Enhancer may create a Validator object (118 of FIG. 1). By tracking the Data Identifier for the control for which an error message has been generated, the window code can use the information to find the Control Enhancer to correct the situation. Once data has been validated, it is then passed to the Data Storage Handler which writes the data to the appropriate place at step 423.

If the event is an Initialize event, as determined at step 430, the event is passed to the Data Initializer at step 431 and the initial data is retrieved and displayed at step 432. After display at 432, as well as after Action execution at 414 or data saving at 423, the method returns at 406 to await another window event.

There are circumstances in GUI development under which a programmer needs to handle a group of controls as a single entity. For example, a date entry set of fields may consist of a spin button for the year, a drop-down list for the month, and another spin button for the day. Although the date is stored in the data base as a single field, and has only one Data Identifier, it is more likely that the GUI will allow the user to select each component of the date through an easy-to-use control, appropriate for that component. For the foregoing example, three Control Enhancers are optimally created, one for each of the components. However, since the Data Storage needs to be aware of all three Control Enhancers, a Multi-Control Enhancer should be used. A Multi-Control Enhancer is written to handle the separate components as both a single entity and as multiple separate components. The Multi-Control Enhancer provides the same interface as all of the other Control Enhancers for its associated components (i.e., the Data Initializer, etc.), but handles its unique data as appropriate. It may be assigned any Data Storage, Relationships, etc. as above, but its Initializer and Finalizer are quite specific to its tasks.

A Multi-Control Enhancer may or may not need to manage the controls with its own Control Enhancers. It may be easier to manage the controls directly in some cases; however, using Control Enhancers allows the programmer to change the individual data controls later without affecting the Multi-Control Enhancer code. A Multi-Control Enhancer can be a composite of existing Control Enhancers which themselves may be a composite of Control Enhancers. For example, six controls are shown as follows:

a control to select the month (limited from 1–12);
  a control to select to day (limited from 1–28/29/30/31, based upon the month and year selected);
  a control to enter a year (4 digit value);
  a control for the hour (limited from 0–23);
  a control for the minute (limited from 0–59); and
  a control for the second (limited from 0–59).

To get the date, a Date Multi-Control Enhancer is built which controls the first three controls, with all of the relationships to limit the day based on the month and the year. The first three controls also have simple Control Enhancers controlling them which are what the Date Multi-Control Enhancer uses to access their data. The Date Multi-Control Enhancer knows how to get the data from these three Control Enhancers and combine these values into one value. In this way, all of that information need not be re-coded for a DateTime Control Enhancer.

Similarly, a Time Multi-Control Enhancer is built for the last three controls. Therefore, to build a DateTime Multi-Control Enhancer, a composite of the Date and the Time Multi-Control Enhancers is built. The new DateTime Control Enhancer simply combines the values from the Date Control Enhancer and the Time Control enhancer to build a single DateTime value. It is a function of the Multi-Control Enhancer to take existing Control Enhancers and combine them to make a more sophisticated Control Enhancer.

Figure 3B:
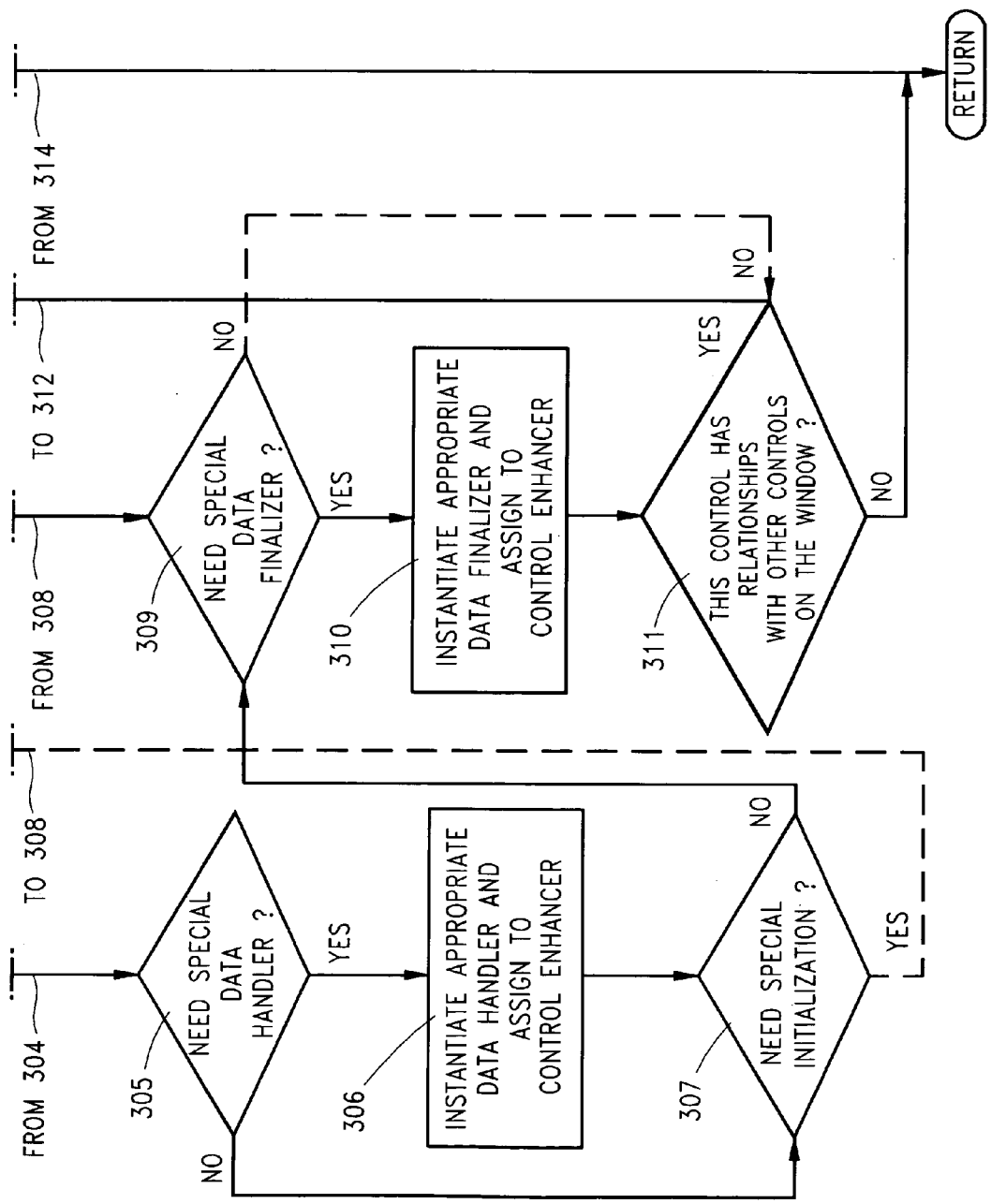
FIG. 3 provides a representative process flow for programming control enhancers in window code.
Figure 4A:
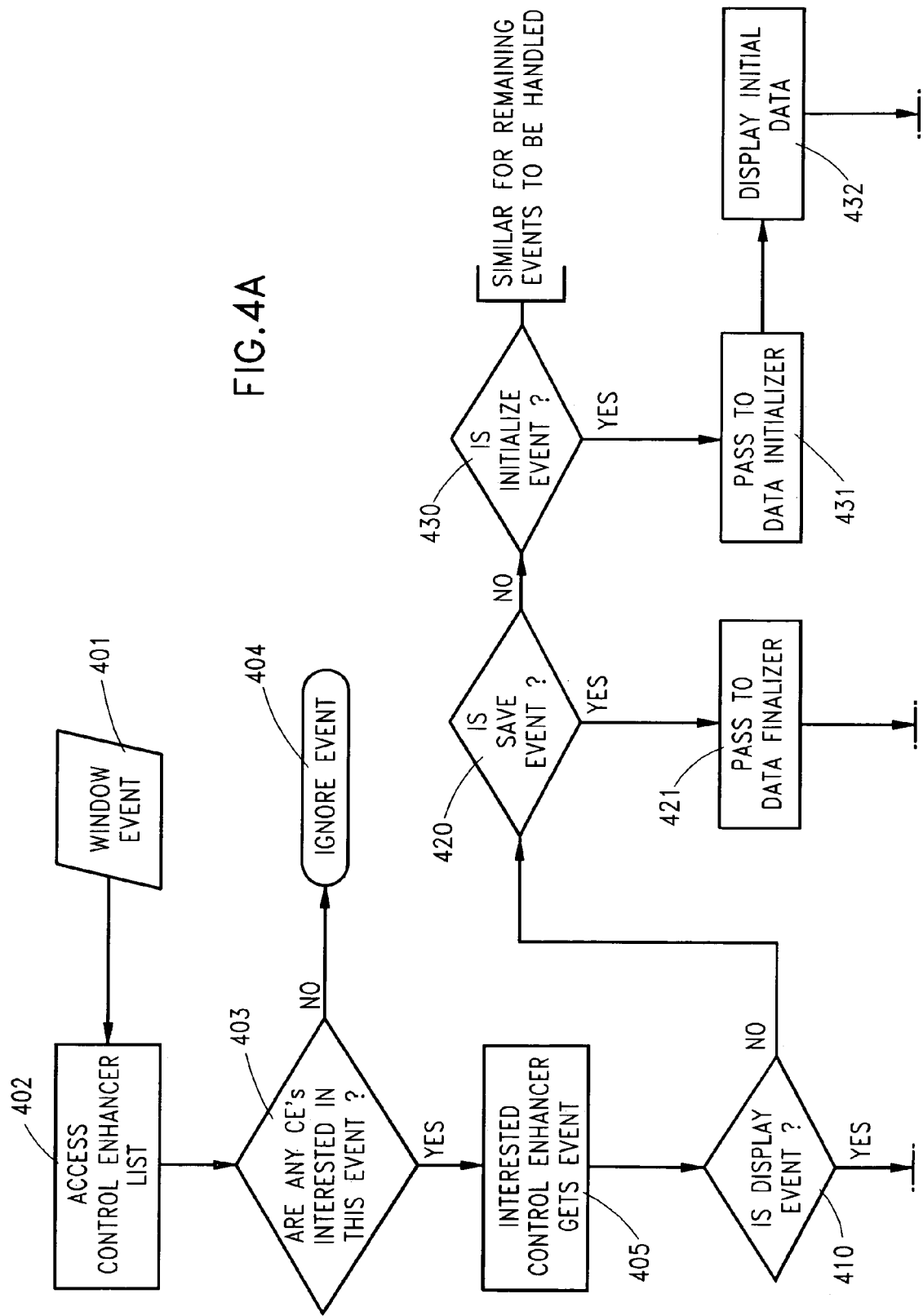
FIG. 4 provides a representative process flow for event handling by the inventive system.

Each Control Enhancer has the same interface when in a Multi-Control situation. A new Multi-Control Enhancer is created for each instance in which the programmer needs to satisfy the conditions wherein it is desired to have multiple GUI controls function as a single control. With reference to FIG. 3, when programming in the window code for the Multi-Control Enhancer setup, the only programming difference is in step 303, such that multiple pointers will be created.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A system for providing enhanced functionality for handling each event of at least one event received at the application display area of a window object having a plurality of window controls comprising:
   a plurality of control enhancer objects, each providing an interface to one specific window application control for said window object and being customized with specific behaviors from a plurality of base classes and subclasses; and
   a list of said control enhancer objects for said window object, whereby said window object passes an event received at the application display area to all of said control enhancer objects on said list and wherein said control enhancer objects determine which of said plurality of control enhancer objects should handle the received event,
   wherein a first one of said window controls is related to at least one second of said window controls, said control enhancer object for said first window control further comprising at least one pointer to the control enhancer object for said second window control; at least one means for determining if an action at said control enhancer object for said first window control affects said control enhancer object for said second window control; and means for communicating with said control enhancer object for said second window control.

2. The system of claim 1 wherein each of said plurality of control enhancer objects is customized with at least one data storage handler.

3. The system of claim 1 wherein each of said plurality of control enhancer objects is customized with at least one data initializer.

4. The system of claim 1 wherein each of said plurality of control enhancer objects is customized with at least one data finalizer.

5. The system of claim 4 wherein at least one of said control enhancer objects further comprises means for validating data at said data finalizer.

6. The system of claim 1 wherein at least one of said control enhancer objects further comprises means for determining limits to be placed on data related to said control enhancer object.

7. The system of claim 1 wherein at least one of said control enhancer objects further comprises means for identifying data related to the window control of said at least one control enhancer object.

8. A system for providing enhanced functionality for handling each event of at least one event received by a window object in an application display area of the window, said window object having a plurality of window controls comprising:
   a plurality of base classes and subclasses representing discrete behaviors;
   a plurality of control enhancer objects, each providing an interface to a one specific window application control for said window object, each of said control enhancer objects being customized with at least one of a plurality of specific behaviors using said plurality of base classes and subclasses comprising at least one data storage handler, at least one data initializer; and at least one data finalizer; and
   a list of said control enhancer objects for said window object, whereby said window object passes an event received at the application display area to all of said control enhancer objects on said list and wherein said control enhancer objects determine which of said plurality of control enhancer objects should handle the received event,
   wherein a first one of said window controls is related to at least one second of said window controls, said control enhancer object for said first window control further comprising at least one pointer to the control enhancer object for said second window control; at least one means for determining if an action at said control enhancer object for said first window control affects said control enhancer object for said second window control; and means for communicating with said control enhancer object for said second window control.

9. The system of claim 8 wherein at least one of said control enhancer objects further comprises means for determining limits to be placed on data related to said control enhancer object.

10. The system of claim 8 wherein at least one of said control enhancer objects further comprises means for validating data at said data finalizer.

11. The system of claim 8 wherein at least one of said control enhancer objects further comprises means for identifying data related to the window control of said at least one control enhancer object.

12. A method for providing enhanced functionality of window controls in response to at least one event received at the application display area of said window, said window comprising a plurality of window controls, and wherein each of a plurality of control enhancer objects provides an interface to a one specific window application control for said window object and is customized with specific behaviors from a plurality of base classes and subclasses, comprising the steps of:
receiving an event at the application display area of said window;
determining at least one of said plurality of control enhancer objects that is interested in said event;
passing said event to said at least one interested control enhancer object; and
handling said event at said at least one interested control enhancer object,
wherein said window controls have relationships and wherein said received event is a display event further comprising the steps of:
determining if said display event affects at least one of said relationships;
evaluating whether at least one rule for said at least one relationship is true; and
executing at least one action if said at least one rule is true.

13. The method of claim 12 wherein said window comprises a control enhancer object list of events affecting each of said listed control enhancer objects and wherein said determining at least one of said plurality of control enhancers comprises:
accessing said list of events;
comparing said received event to said list of events; and
determining interested control enhancer objects based on said comparing.

14. A method for rapid graphical user interface development for providing an enhanced control for event handling on a window comprising the steps of:
creating a plurality of base classes and subclasses for discrete behaviors;
creating at least one window application control for said window;
instantiating a control enhancer object as an interface to said window for said control;
customizing said control enhancer object by associating selected behaviors to it using said plurality of classes and subclasses; and
passing a pointer for said control to said control enhancer, and
wherein said associating comprises the steps of:
determining if said control has at least one relationship with at least one other control on said window;
instantiating said at least one relationship;

assigning said at least one relationship to said control enhancer object; and
passing a pointer to each of said at least one other control.

15. The method of claim 14 wherein said associating comprises the steps of:
determining if special data handling is required; and
instantiating at least one data handler if special handling is required; and
assigning said data handler to said control enhancer object.

16. The method of claim 15 wherein said associating comprises the steps of:
determining if special initialization is required;
instantiating at least one data initializer if special initialization is required; and
assigning said at least one data initializer to said control enhancer object.

17. The method of claim 16 wherein said associating comprises the steps of:
determining if special data finalization is required;
instantiating at least one data finalizer if special finalization is required; and
assigning said at least one data finalizer to said control enhancer object.

18. The method of claim 15 wherein said associating comprises the steps of:
determining if special data finalization is required;
instantiating at least one data finalizer if special finalization is required; and
assigning said at least one data finalizer to said control enhancer object.

19. The method of claim 14 wherein said associating comprises the steps of:
determining if special initialization is required;
instantiating at least one data initializer if special initialization is required; and
assigning said at least one data initializer to said control enhancer object.

20. The method of claim 19 wherein said associating comprises the steps of:
determining if special data finalization is required;
instantiating at least one data finalizer if special finalization is required; and
assigning said at least one data finalizer to said control enhancer object.

21. The method of claim 14 wherein said associating comprises the steps of:
determining if special data finalization is required;
instantiating at least one data finalizer if special finalization is required; and
assigning said at least one data finalizer to said control enhancer object.

22. The method of claim 14 further comprising:
instantiating at least one rule for said at least one relationship; and
assigning said at least one rule to said at least one relationship.

23. The method of claim 22 further comprising:
instantiating at least one action for said at least one rule; and
assigning said at least one action to said at least one rule.

24. A system for rapid graphical user interface development for providing enhanced control for event handling on a window comprising:
class means for creating a plurality of base classes and subclasses for discrete behaviors;

control enhancer creation means for instantiating a control enhancer object as an interface to said window for a window application control; and control enhancer customizing means for customizing said control enhancer object by associating selected behaviors to it using said plurality of classes and subclasses, wherein said associating comprises the steps of:

determining if said control has at least one relationship with at least one other control on said window;

instantiating said at least one relationship;

assigning said at least one relationship to said control enhancer object; and passing a pointer to each of said at least one other control.

* * * * *